United States Patent Office 3,576,900
Patented Apr. 27, 1971

3,576,900
PREPARATION OF DIOLEFINS FROM TERTIARY AND SECONDARY ALKYL HALIDES
Kenneth J. Frech, Tallmadge, and Frederic H. Hoppstock and Louis A. Falvo, Akron, Ohio, assignors to The Goodyear Tire & Rubber Company, Akron, Ohio
No Drawing. Filed Feb. 27, 1969, Ser. No. 803,100
Int. Cl. C07c 1/30
U.S. Cl. 260—680
9 Claims

ABSTRACT OF THE DISCLOSURE

A process is disclosed for the preparation of diolefins which comprises simultaneously dehydrohalogenating and dealkylating a halide selected from the group of 2-halo pentanes, 3-halo pentanes, 2-halo-2-methyl pentanes, 3-halo-3-methyl pentanes, 2-halo-3-methyl pentanes, 3-halo-2-methyl pentanes, 2-halo-4-methyl pentanes, 3-halo hexanes, 3-halo-3-ethyl pentanes, 2-halo-3-ethyl pentanes, 2-halo-2-ethyl pentanes, 3-halo-4-methyl hexanes, 3-halo-2-methyl hexanes, 3-halo-5-methyl hexanes, 2-halo-4-methyl hexanes, 2-halo-hexanes, 2-halo-2-methyl hexanes, 2-halo-3-methyl hexanes, 3-halo heptanes, 3-halo-3-ethyl-hexanes, 3-halo-3-methyl heptanes, 3-halo-4-methyl heptanes, and 3-halo-2-methyl heptanes, over a catalyst which is an oxide of an element selected from the group of copper, beryllium, magnesium, calcium, strontium, barium, zinc, cadmium, boron, aluminum, gallium, indium, silicon, tin, lead, titanium, zirconium, antimony, bismuth, vanadium, chromium, molybdenum, tungsten, manganese, rhenium, iron, cobalt, nickel, cerium, praseodymium and thorium, at temperatures of 500° C. to 800° C.

This invention is directed to the preparation of diolefins from secondary and tertiary alkyl halides. More particularly, it is directed to the formation of various diolefins from certain secondary and tertiary halides by the simultaneous or concerted dealkylation and dehydrohalogenation of these secondary and tertiary alkyl halides.

Diolefins such as 1,3-butadiene, isoprene, piperylene, 2-ethyl-1,3-butadiene, 3 - methyl - 1,3 - pentadiene, 2-methyl - 1,3 - pentadiene, 4-methyl - 1,3 - pentadiene, 1,3 - hexadiene and 2,4 - hexadiene are known to be useful as intermediates in the formation of other organic chemicals. However, the most widely known general use is the formation of synthetic rubbers by polymerization of such diolefins.

Various methods for the preparation of these various diolefins are known. For instance, one well known method is to dehydrogenate the corresponding paraffin and/or olefin to form a diolefin containing the same number of carbon atoms as did the olefin and/or paraffin. As an example, butane or any of the normal butenes can be dehydrogenated to form 1,3-butadiene. Likewise, 2-methyl butane or 2-methyl-1 and/or 2-butene can be dehydrogenated to form isoprene.

Another known method of preparing diolefins is the dealkylation of olefins containing more carbon atoms than does the diolefin desired and which has substituents, if any, in a position corresponding to that of the desired olefins. For example, pentene-2 can be demethanated to form 1,3-butadiene, 2- and/or 3-methyl pentene-2 can be demethanated to form 2-methyl-1,3-butadiene or isoprene. Likewise, 2-ethyl - 2 - pentene and/or 3-ethyl-2-pentene can be demethanated to form 2-ethyl 1,3-butadiene. Likewise, 2- and/or 3-methyl hexane-2 can be de-ethanated to form isoprene. Various other paraffins and olefins containing the proper configuration and the proper number of carbon atoms can be dehydrogenated to form the corresponding diolefin. Likewise, other olefins containing the proper configuration and the proper number of carbon atoms can be dealkylated to form diolefins.

These prior art processes, while they are being employed commercially to produce diolefins, have been found to have certain deficiencies or limitations and for this reason are somewhat costly to operate.

When paraffins are dehydrogenated to form diolefins, the reaction efficiencies or selectivities are not too high. For instance, when normal butane is dehydrogenated to form the diolefin, 1,3-butadiene, the efficiencies or selectivities have been found to be no greater than about 55–60% at reasonable conversion levels and throughput rates. (The term "efficiency" or "selectivity" as employed in this application is meant to denote the amount of feedstock which is ultimately converted into the desired diolefin employing normal recycle techniques, whether it be a dehydrogenation process, a dealkylation process of the prior art, or, as in the case of this invention, a simultaneous or concerted dealkylation and dehydrohalogenation process. The remainder of the feedstock which undergoes a reaction, is converted into unwanted byproducts due to side reactions and the like.) In the dehydrogenation process to form diolefins where the starting material is an olefin, for instance, where butenes are dehydrogenated to form butadiene-1,3 while the efficiencies are acceptable, the capital investment is extremely high. This high capital investment is due to the fact that large quantities of a diluent, usually steam, must be put through the dehydrogenation process along with the olefin to reduce the partial pressure of the reactant olefin and to reduce the amount of coking in the catalyst bed. This large quantity of diluent is also required when paraffins are dehydrogenated as well for the same reason. An alternative to the use of large amounts of diluent is to operate at reduced pressure. Further, even though large quantities of a diluent, such as steam, are employed, coking of the catalyst bed becomes a problem because the effectiveness of the catalyst must be regenerated quite often. This fact also leads to a high operating cost as well as a high original capital investment cost for the required large steam plant and multiple dehydrogenation reactors.

In processes which form diolefins by demethanation or dealkylation of olefins, such as the demethanation of 2-methyl-2-pentene to form isoprene, the efficiencies or selectivities have not been found to exceed about 55% to 60%. This means that such processes employing dealkylation can be improved on because significant amounts of starting material or feedstock is converted into unwanted byproducts.

It is, therefore, the object of this invention to provide a process for the manufacture of diolefins wherein certain secondary and tertiary alkyl halides are converted into diolefins at high efficiencies or selectivities. It is, also, the object of this invention to provide a process for the manufacture of diolefins from certain secondary and tertiary alkyl halides in which the capital cost is somewhat lower than those of the known prior art processes now in commercial use.

According to the invention, these and other objects are accomplished by simultaneously dehydrohalogenating and dealkylating secondary and tertiary alkyl halides to produce diolefins.

The conditions required to simultaneously dehydrohalogenate and dealkylate alkyl halides can vary somewhat. The temperatures required for the simultaneous dehydrohalogenation and dealkylation of alkyl halides can vary from about 500° C. to about 800° C. The times that the alkyl halides are exposed to these temperatures can vary from about 0.01 second to about 2.0 seconds and is usually referred to as residence time.

While it is possible to expose the secondary and tertiary alkyl halides to these operating conditions, particularly the temperature, without the use of some gaseous heat transfer agent, it has been found that best results can be obtained if a gaseous heat transfer agent is employed to cause the alkyl halides to reach the desired temperature as quickly as possible to cause the simultaneous dehydrohalogenation and dealkylation. If it is desired to employ a gaseous heat transfer agent, any inert gaseous heat transfer agent may be employed. Representative of such inert heat transfer agents which may be employed are steam, inert gases, such as nitrogen, neon, argon, helium, saturated hydrocarbons such as methane, ethane, propane and certain other olefins which, themselves, will not be degraded at the operating conditions. Representative of such olefins are ethylene, propylene, butene-2, isobutene, 2-methyl-butene-2, 2,3-dimethyl-butene-2. Other inert gaseous heat transfer agents may also be employed.

If a gas heat transfer is desired, the amount of gaseous heat transfer agent to the alkyl halide will depend on a number of factors. The inlet temperature of the alkyl halides is one factor; the inlet temperature of the gaseous heat transfer medium is another factor; the operating temperature desired is a factor; and the specific heats or heat transfer potential of the particular gaseous heat transfer medium and alkyl halide employed is a factor. Thus, the ratio of the gaseous heat transfer agent to the alkyl halides depends largely upon the particular operating conditions desired, the inlet temperature of the reactants and the heat transfer agent and the specific heat or heat transfer potential of the materials employed. One skilled in the art can readily determine the proper ratio and the temperature required between the particular alkyl halide and the particular gaseous heat transfer agent which is to be employed in the process.

The simultaneous dehydrohalogenation and dealkylation of alkyl halides to form diolefins in accordance with the practice of this invention can be accomplished at the operating conditions previously mentioned in the presence of a catalytic surface. These catalytic surfaces may be best described as a catalytic surface having an acid nature as well as a basic nature. These catalysts may also be described as a metal chemically bound to another element leading to acidic properties and basic properties. Such a catalytic surface can be either in the form of a fixed bed or fluidized bed. It has been found that suitable catalysts for the purposes of this invention can be a fixed bed metal oxide or a fluidized bed metal oxide.

Of the catalysts which can be employed, it is usually preferable to employ metal oxides wherein the metal is selected from Groups Ib, IIa, IIb, IIIa, IVa, IVb, Va, Vb, VIb, VIIb, VIII and the lanthanum and actinium series of the Periodic Table of Elements. Representative of the metal oxides of Group Ib are the oxides of copper and gold. Representative of the metal oxides of Group IIa are the oxides of beryllium, magnesium, calcium, strontium and barium. Representative of the metal oxides of Group IIb are the oxides of zinc, cadmium and mercury. Representative of the metal oxides of Group IIIa are oxides of boron, aluminum, gallium and indium. Representative of the metal oxides of the metal IVa are oxides of silicon, tin and lead. Representative of the metal oxides of Group IVb are the oxides of titanium and zirconium. Representative of metal oxides of Groups Va are the oxides of antimony and bismuth. Representative of the metal oxides of Group Vb are oxides of vanadium. Representative of metal oxides of Group VIb are the oxides of chromium, molybdenum and tungsten. Representative of the metal oxides of the metals of Group VIIb are oxides of manganese and rhenium. Representative of the metal oxides of Group VIII metals are the oxides of iron, cobalt and nickel. Representative of the metal oxides of the lanthanum series are the oxides of cerium and praseodymium. Representative of the metal oxides of the actinium series are the oxides of thorium.

The secondary and tertiary alkyl halides which may be simultaneously dealkylated and dehydrohalogenated to form diolefins which are useful in this invention are those secondary and tertiary alkyl halides which have the proper configuration to be converted by dealkylation-dehydrohalogenation into the desired diolefin.

Representative of the secondary and tertiary alkyl halides which can be demethanated-dehydrohalogenated to form butadiene are the 2-halo pentanes such as 2-chloro pentane, 2-bromo pentane, and the 3-halo pentanes such as 3-chloro pentane and 3-bromo pentane.

Representative of the secondary and tertiary alkyl halides which can be converted to isoprene by demethanationdehydrohalogenation are the 2-halo-2-methyl pentanes such as 2-chloro-2-methyl pentane and 2-bromo-2-methyl pentane; the 3-halo-3-methyl pentanes such as 3-chloro-3-methyl pentane and 3-bromo-3-methyl pentane; the 2-halo-3-methyl pentanes such as 2-bromo-3-methyl pentane and 2-chloro-3-methyl pentane; and the 3-halo-2-methyl pentanes such as 3-chloro-2-methyl pentane and 3-bromo-2-methyl pentane.

The secondary and tertiary alkyl halides which can be converted by demethanation-dehydrohalogenation by the use of this invention to piperylene are the 2-halo-4-methyl pentanes such as 2-chloro-4-methyl pentane and 2-bromo-4-methyl pentane; and the 3-halo hexanes such as 3-chloro hexane and 3-bromo hexane.

Representative of the secondary and tertiary alkyl halides which will produce by demethanation-dehydrohalogenation 2-ethyl-1,3-butadiene in accordance with this invention are the 3-halo-3-ethyl pentanes such as 3-chloro-3-ethyl pentane and 3-bromo-3-ethyl pentane; and the 2-halo-3-ethyl pentanes such as 2-chloro-3-ethyl pentane and 2-bromo-3-ethyl pentane.

Representative of the alkyl halides which can be employed to produce 3-methyl-1,3-pentadiene by demethanation-dehydrohalogenation are the 2-halo-2-ethyl pentanes (3-halo-3-methyl hexanes) such as 2-chloro-2-ethyl pentane (3-chloro-3-methyl hexanes) and 2-bromo-2-ethyl pentane (3-bromo-3-methyl hexane).

Representative of the alkyl halides which will produce 2-methyl-1,3-pentadiene by demethanation-dehydrohalogenation according to the invention are the 3-halo-4-methyl hexanes such as 3-chloro-4-methyl hexane and 3-bromo-4-methyl hexane.

Representative of the alkyl halides which will form 4-methyl-1,3-pentadiene by demethanation-dehydrohalogenation are the 3-halo-2-methyl hexanes such as 3-chloro-2-methyl hexane and 3-bromo-2-methyl hexane.

Representative of the alkyl halides which will form 1,3- or 2,4-hexadiene by dehydrohalogenation-demethanation are the 3-halo-5-methyl hexanes such as 3-chloro-5-methyl hexane and 3-bromo-5-methyl hexane; and the 2-halo-4-methyl hexanes such as 2-bromo-4-methyl hexane and 2-chloro-4-methyl hexane.

Of course, the other halogens can be substituted in the above alkyl halides to form the iodo and the fluoro derivatives as well as the chloro and bromo derivatives.

Representative of the alkyl halides which can be deethanated-dehydrohalogenated to form butadiene by the practice of this invention are the 2-halo hexanes such as 2-chloro hexane or 2-bromo hexane.

Representative of the alkyl halides which will produce isoprene upon de-ethanation-dehydrohalogenation in accordance with this invention are the 2-halo-2-methylhexanes such as 2-chloro-2-methyl hexane; and the 2-halo-3-methyl hexanes such as 2-bromo-3-methyl hexane.

Representative of the alkyl halides which will produce piperylene by de-ethanation-dehydrohalogenation in accordance with this invention are the 3-halo heptanes such as 3-bromo and 3-chloro heptane.

The alkyl halides which will form 2-ethyl-1,3-butadiene by de-ethanation-dehydrohalogenation in accordance with the invention are the 3 - halo - 3 - ethyl hexanes such as 3-chloro-3-ethyl hexane and 3-bromo-3-ethyl hexane.

Representative of the alkyl halides which will produce 3-methyl-1,3-pentadiene by de-ethanation-dehydrohalogenation are the 3-halo-3-methyl heptanes such as 3-chloro-3-methyl heptane.

Representative of the precursors of 2-methyl-1,3-pentadiene by de-ethanation-dehydrohalogenation are the 3-halo-4-methyl heptanes such as 3-bromo-4-methyl heptane and 3-chloro-4-methyl heptane.

Representative of the alkyl halides which are precursors of 4-methyl-1,3-pentadiene when de-ethanated-dehydrohalogenated in accordance with the invention are the 3-halo-2-methyl heptanes such as 3-chloro-2-methyl heptane and 3-chloro-2-methyl heptane.

Of course, all halogen derivatives of the various alkyl halides can be employed to form iodo, fluoro, bromo and chloro derivatives of the above alkyl halides.

The practice of this invention is further illustrated by reference to the following examples which are intended to be representative rather than restrictive of the scope of the invention.

EXAMPLE I

In this example 3-chloro-3-methyl pentane was simultaneously dehydrohalogenated and demethanated to form isoprene. The procedure employed was as follows: A reactor containing a fused silica or quartz liner of 0.37 inch internal diameter and 8 inches in length, was packed with 8–16 mesh fused silica or quartz chips, was inserted tightly into a reactor block which has provision for electrically heating the reactor. A preheater was employed to help bring the temperature of the diluent and the reactant to the desired mixpoint temperatures. The diluent which is enumerated in the table below, if any, was directed through the preheater and then 3-chloro-3-methyl pentane was directed through the preheater and the reactor. The reactor was brought up to the desired operating temperature which is indicated in the table below, by the electrical heating system. When the temperature and flow were adjusted to the temperatures and times set forth in the table below, the effluent from the reactor was collected and analyzed by conventional vapor phase chromatographic techniques.

In this experiment the operating conditions and results are listed in the table below. In one experiment, No. 3, no diluent or gas transfer medium was employed. In Experiment Nos. 1 and 4 steam was employed as the heat transfer medium or diluent. In two runs, Experiment Nos. 2 and 5, nitrogen was employed as a heat transfer medium. In the table below, column 1 is the experiment number; column 2 is the temperatures in degrees centigrade; column 3 is the residence time in seconds; column 4 is the molar ratio of the particular diluent to the 3-chloro-3-methyl pentane; column 5 is the isoprene yield per pass, and column 6 is the reaction selectivity or efficiency and indicates the ultimate production of isoprene used on the amount of 3-chloro-3-methyl pentane which undergoes degradation employing recycle techniques.

TABLE 1

| Exp. No. | Temp., °C. | Residence time, seconds | Diluent | Molar ratio to reactant | Isoprene yield, mole percent | Reaction selectivity, percent |
|---|---|---|---|---|---|---|
| 1 | 625 | .27 | $H_2O$ | 4/1 | 27 | 75 |
| 2 | 625 | .31 | $N_2$ | 3.5/1 | 20 | 72 |
| 3 | 675 | .22 | None | | 27 | 70 |
| 4 | 675 | .24 | $H_2O$ | 5/1 | 53 | 76 |
| 5 | 675 | .34 | $N_2$ | 4/1 | 52 | 72 |

EXAMPLE II

This example was conducted to illustrate that dehydrohalogenation and demethanation takes place simultaneously and dehydrohalogenation does not take place to form an olefin which is subsequently demethanated to form isoprene. In this experiment the olefin 3-methyl-2-pentene was employed as a reactant which was demethanated to form isoprene. The reactor and the catalyst employed was identical to that employed in Example 1. The operating conditions are set forth in the table below and each column represents the same as in Example 1 except that the reactant, of course, instead of being the alkyl halide, 3-methyl-3-chloro pentane, is the olefin, 3-methyl-2-pentene. This is the olefin which would be produced by the dehydrohalogenation of 3-chloro-3-methyl pentane.

TABLE 2

| Exp. No. | Temp., °C. | Residence time, seconds | Diluent | Molar ratio to reactant | Isoprene yield, mole percent | Reaction selectivity, percent |
|---|---|---|---|---|---|---|
| 1 | 625 | .39 | $H_2O$ | 3/1 | 5 | 42 |
| 2 | 625 | .37 | $H_2O$ | 5/1 | 11 | 29 |
| 3 | 675 | .26 | $H_2O$ | 5/1 | 23 | 40 |

EXAMPLE III

A similar reactor to that employed in Examples 1 and 2 was employed in this example except that the reactor contained only the quartz liner and was not packed with the quartz chips. In this example, 3-chloro-3-methyl pentene was dehydrohalogenated and demethanated simultaneously. The following are the conditions and results:

Temperature: 625° C.
Residence time: 0.22 second
Diluent: Steam
Molar ratio diluent/reactant: 4/1
Isoprene yield mole percent: 9
Isoprene selectivity mole percent: 60

EXAMPLE IV

In this example the identical reactor was employed as was employed in Example 1. The alkyl halide employed for these experiments was 2-chloro-2-methylpentane. In Experiment No. 1 the reactor did not contain any quartz chips. In Experiment 2 the reactor contained quartz chips. The results and operating conditions are set forth in the table below. The headings of the table are identical to that of Table 1, Example 1.

TABLE 4

| Exp. No. | Temp., °C. | Residence time, seconds | Diluent | Molar ratio to reactant | Isoprene yield, mole percent | Reaction selectivity, percent |
|---|---|---|---|---|---|---|
| 1 | 625 | 0.23 | $H_2O$ | 5/1 | 10 | 43 |
| 2 | 625 | 0.18 | $H_2O$ | 6/1 | 24 | 65 |

It can be seen from these examples that the simultaneous dehydrohalogenation-dealkylation of secondary and tertiary alkyl halides to produce diolefins is unique and superior to many prior art processes.

The pressure at which the secondary and tertiary alkyl halides are simultaneously dehydrohalogenated and dealkylated may vary broadly. The pressure may vary from a range of about 10 millimeters of mercury to about 500 pounds per square inch absolute. A more preferred range is from about 100 millimeters of mercury to about 100 pounds per square inch absolute. A still more preferred pressure would be from about 0.5 atmosphere to about 50 pounds per square inch absolute.

While certain representative embodiments and details have been shown for the purpose of illustrating the invention, it will become apparent to those skilled in this art that various changes and modifications may be made therein without departing from the spirit or scope of the invention.

What is claimed is:

1. A process for the preparation of diolefins which comprises simultaneously dehydrohalogenating and dealkylating at least one alkyl halide selected from the group consisting of 2-halo pentanes, 3-halo pentanes, 2-halo-2-methyl pentanes, 3-halo-3-methyl pentanes, 2-halo-4-methyl pentanes, 3-halo-2-methyl pentanes, 2-halo-4-methyl pentanes, 3-halo hexanes, 3-halo-3-ethyl pentanes, 2-halo-3-ethyl pentanes, 2-halo-2-ethyl pentanes, 3-halo-4-methyl hexanes, 3-halo-2-methyl hexanes, 3-halo-5-methyl hexanes, 2-halo-4-methyl hexanes, 2-halo-hexanes, 2-halo-2-methyl hexanes, 2-halo-3-methyl hexanes, 3-halo heptanes, 3-halo-3-ethyl hexanes, 3-halo-3-methyl heptanes, 3-halo-4-methyl heptanes, and 3-halo-2-methyl heptanes at temperatures from 500° to about 800° C. for residence times ranging from about 0.01 to about 2.0 seconds with a catalyst comprising an oxide of an element selected from the group consisting of copper, beryllium, magnesium, calcium, strontium, barium, zinc, cadmium, boron, aluminum, gallium, indium, silicon, tin, lead, titanium, zirconium, antimony, bismuth, vanadium, chromium, molybdenum, tungsten, manganese, rhenium, iron, cobalt, nickel, cerium, praseodymium and thorium.

2. A process according to claim 1 in which the alkyl halide is selected from the group of 2-halo-pentanes, 3-halo-pentanes, 2-halo-hexanes and 3-halo-hexanes and wherein butadiene-1,3 is the diolefin produced.

3. A process according to claim 1 in which the alkyl halide is selected from the group consisting of 2-halo-2-methyl pentanes, 3-halo-3-methyl pentanes, 2-halo-3-methyl pentanes, 3-halo-2-methyl pentanes, 2-halo-2-methyl hexanes and 2-halo-3-methyl hexanes, and in which isoprene is the diolefin produced.

4. A process according to claim 1 in which the alkyl halide is selected from the group consisting of 2-halo-4-methyl pentanes, 3-halo-hexanes, and 3-halo-heptanes, and in which piperylene is the diolefin produced.

5. A process according to claim 1 in which the alkyl halide is selected from the group consisting of 3-halo-3-ethyl pentanes, 2-halo-3-ethyl pentanes, and 3-halo-3-ethyl hexanes, and in which 2-ethyl-1,3-butadiene is the diolefin produced.

6. A process according to claim 1 in which the alkyl halide is selected from the group consisting of 2-halo-2-ethyl pentanes and 3-halo-3-ethyl heptanes and in which 3-methyl-1,3-pentadiene is the diolefin produced.

7. A process according to claim 1 in which the alkyl halide is selected from the group consisting of 3-halo-4-methyl hexanes, and 3-halo-4-methyl heptanes, and in which 2-methyl-1,3-pentadiene is the diolefin produced.

8. A process according to claim 1 in which the alkyl halide is selected from the group consisting of 3-halo-2-methyl hexanes and 3-halo-2-methyl heptanes, and in which 4-methyl-1,3-pentadiene is the diolefin produced.

9. A process according to claim 1 in which the alkyl halide is selected from the group consisting of 3-halo-5-methyl hexanes and 2-halo-4-methyl hexanes and in which 1,3- or 2,4-hexadiene is the diolefin produced.

References Cited
UNITED STATES PATENTS

| | | | |
|---|---|---|---|
| 1,975,456 | 10/1934 | Hass et al. | 260—677X |
| 3,209,048 | 9/1965 | Burk et al. | 260—680 |
| 3,233,006 | 2/1966 | Burk et al. | 260—680 |
| 3,287,437 | 11/1966 | Frech | 260—680 |
| 3,341,616 | 9/1967 | Vives | 260—677 |

PAUL M. COUGHLAN, JR., Primary Examiner

PO-1050
(5/69)

UNITED STATES PATENT OFFICE
CERTIFICATE OF CORRECTION

Patent No. 3,576,900                    Dated April 27, 1971

Inventor(s) Kenneth J. Frech, Frederic H. Hoppstock and Louis A.

It is certified that error appears in the above-identified patent and that said Letters Patent are hereby corrected as shown below:

Column 2, line 38, after "catalyst" insert -- is lowered when the catalyst becomes coked and the catalyst --.

Column 4, line 13, the first words of that line should read -- anation dehydrohalogenation --.

Signed and sealed this 2nd day of November 1971.

(SEAL)
Attest:

EDWARD M. FLETCHER, JR.
Attesting Officer

ROBERT GOTTSCHALK
Acting Commissioner of Patent